US008155550B2

(12) United States Patent
Mita

(10) Patent No.: US 8,155,550 B2
(45) Date of Patent: Apr. 10, 2012

(54) PRINTER ENGINE HAVING A JUDGMENT UNIT AND A CONTROL UNIT THAT TRANSMITS TO A CONTROLLER

(75) Inventor: Takuro Mita, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/116,409

(22) Filed: May 26, 2011

(65) Prior Publication Data

US 2011/0222893 A1 Sep. 15, 2011

Related U.S. Application Data

(63) Continuation of application No. 12/146,722, filed on Jun. 26, 2008, now Pat. No. 7,978,996, which is a continuation of application No. 10/760,296, filed on Jan. 21, 2004, now Pat. No. 7,424,239.

(30) Foreign Application Priority Data

Jan. 31, 2003 (JP) .................................. 2003-023664

(51) Int. Cl.
*G03G 15/00* (2006.01)
(52) U.S. Cl. ......................................................... 399/87
(58) Field of Classification Search .................... 399/87, 399/301, 39, 40, 28, 46
See application file for complete search history.

(56) References Cited

U.S. PATENT DOCUMENTS

| 5,933,676 A | 8/1999 | Ohno |
| 6,104,891 A | 8/2000 | Maebashi et al. |
| 6,122,461 A | 9/2000 | Shinohara |
| 6,384,934 B1 | 5/2002 | Kohtani et al. |
| 6,505,012 B2 | 1/2003 | Maebashi et al. |
| 2001/0017645 A1 | 8/2001 | Toda |
| 2002/0028084 A1 | 3/2002 | Maebashi et al. |
| 2002/0028085 A1 | 3/2002 | Nakazato et al. |
| 2004/0150849 A1 | 8/2004 | Mita |

(Continued)

FOREIGN PATENT DOCUMENTS

EP  1184731 A2  3/2002

(Continued)

OTHER PUBLICATIONS

Communication dated Sep. 5, 2011, forwarding a European Search Report dated Aug. 25, 2011, in counterpart European Application No. 04001980.4-2209/ 1462861.

(Continued)

*Primary Examiner* — Quana M Grainger
(74) *Attorney, Agent, or Firm* — Fitzpatrick, Cella, Harper & Scinto

(57) ABSTRACT

To provide an image forming apparatus and a control method for the same, with which an adjustment for satisfying an image quality is performed without fail while an execution frequency of the adjustment can be changed, for example, an unnecessary adjustment can be skipped. The image forming apparatus includes: a controller for issuing a plurality of commands; an engine for executing image formation according to the command; a control portion for holding a condition status indicating an internal condition of the engine and a factor status indicating a factor of the condition status, or the factor status and notifying, in response to the command, the condition status and the factor status, or the factor status; and a judgement unit for judging whether to adjust an image formation condition of the engine or not according to the condition status and the factor status, or the factor status.

4 Claims, 17 Drawing Sheets

U.S. PATENT DOCUMENTS

| | | |
|---|---|---|
| 2005/0213999 A1 | 9/2005 | Hirobe |
| 2006/0013599 A1* | 1/2006 | Taguchi et al. ............ 399/12 |

FOREIGN PATENT DOCUMENTS

| | | |
|---|---|---|
| JP | 10-063146 A | 3/1998 |
| JP | 10-240082 A | 9/1998 |
| JP | 11-015216 A | 1/1999 |
| JP | 2000-015896 A | 1/2000 |
| JP | 2001-024892 A | 1/2001 |
| JP | 2001-154428 A | 6/2001 |
| JP | 2001296704 A * | 10/2001 |
| JP | 2002-029092 A | 1/2002 |
| JP | 2002-189391 A | 7/2002 |
| JP | 2003-025691 A | 1/2003 |

OTHER PUBLICATIONS

Official Letter dated Sep. 22, 2006 in corresponding Chinese Patent Application No. 2004-100004846.

Office Action dated Sep. 27, 2005 in corresponding Korean Patent Application No. 10-2004-0006432.

* cited by examiner

S31
| DENSITY CONTROL EXECUTION REQUEST FACTOR STATUS | |
|---|---|
| BIT | CONTENTS |
| 1st BIT | — |
| 2nd BIT | DENSITY CONTROL EXECUTION REQUEST AT POWER-ON |
| 3rd BIT | DENSITY CONTROL EXECUTION REQUEST FOR EACH PAGE COUNT |
| 4th BIT | DENSITY CONTROL EXECUTION REQUEST AT A CERTAIN ELAPSED TIME |
| 5th BIT | DENSITY CONTROL EXECUTION REQUEST AT ENVIRONMENTAL CHANGE |
| 6th BIT | DENSITY CONTROL EXECUTION REQUEST AT RETURN FROM SLEEP |
| 7th BIT | DENSITY CONTROL EXECUTION REQUEST WHEN NUMBER OF SHEETS PRINTED FROM NEW CRG BECOMES A CERTAIN NUMBER |
| 8th BIT | — |
| 9th BIT | DENSITY CONTROL EXECUTION REQUEST AT CRG EXCHANGE |
| 10th BIT | — |
| 11th BIT | — |
| 12th BIT | — |
| 13th BIT | — |
| 14th BIT | — |
| 15th BIT | — |
| 16th BIT | PARITY BIT |

FIG. 1C

S32 — COLOR MISREGISTRATION AMOUNT MEASUREMENT EXECUTION REQUEST FACTOR STATUS

| BIT | CONTENTS |
|---|---|
| 1st BIT | — |
| 2nd BIT | COLOR MISREGISTRATION AMOUNT MEASUREMENT EXECUTION REQUEST AT POWER-ON |
| 3rd BIT | COLOR MISREGISTRATION AMOUNT MEASUREMENT EXECUTION REQUEST FOR EACH PAGE COUNT |
| 4th BIT | COLOR MISREGISTRATION AMOUNT MEASUREMENT EXECUTION REQUEST AT A CERTAIN ELAPSED TIME |
| 5th BIT | COLOR MISREGISTRATION AMOUNT MEASUREMENT EXECUTION REQUEST AT ENVIRONMENTAL CHANGE |
| 6th BIT | COLOR MISREGISTRATION AMOUNT MEASUREMENT EXECUTION REQUEST AT RETURN FROM SLEEP |
| 7th BIT | COLOR MISREGISTRATION AMOUNT MEASUREMENT EXECUTION REQUEST WHEN NUMBER OF SHEETS PRINTED FROM NEW CRG BECOMES A CERTAIN NUMBER |
| 8th BIT | — |
| 9th BIT | COLOR MISREGISTRATION AMOUNT MEASUREMENT EXECUTION REQUEST AT CRG EXCHANGE |
| 10th BIT | — |
| 11th BIT | — |
| 12th BIT | — |
| 13th BIT | — |
| 14th BIT | — |
| 15th BIT | — |
| 16th BIT | PARITY BIT |

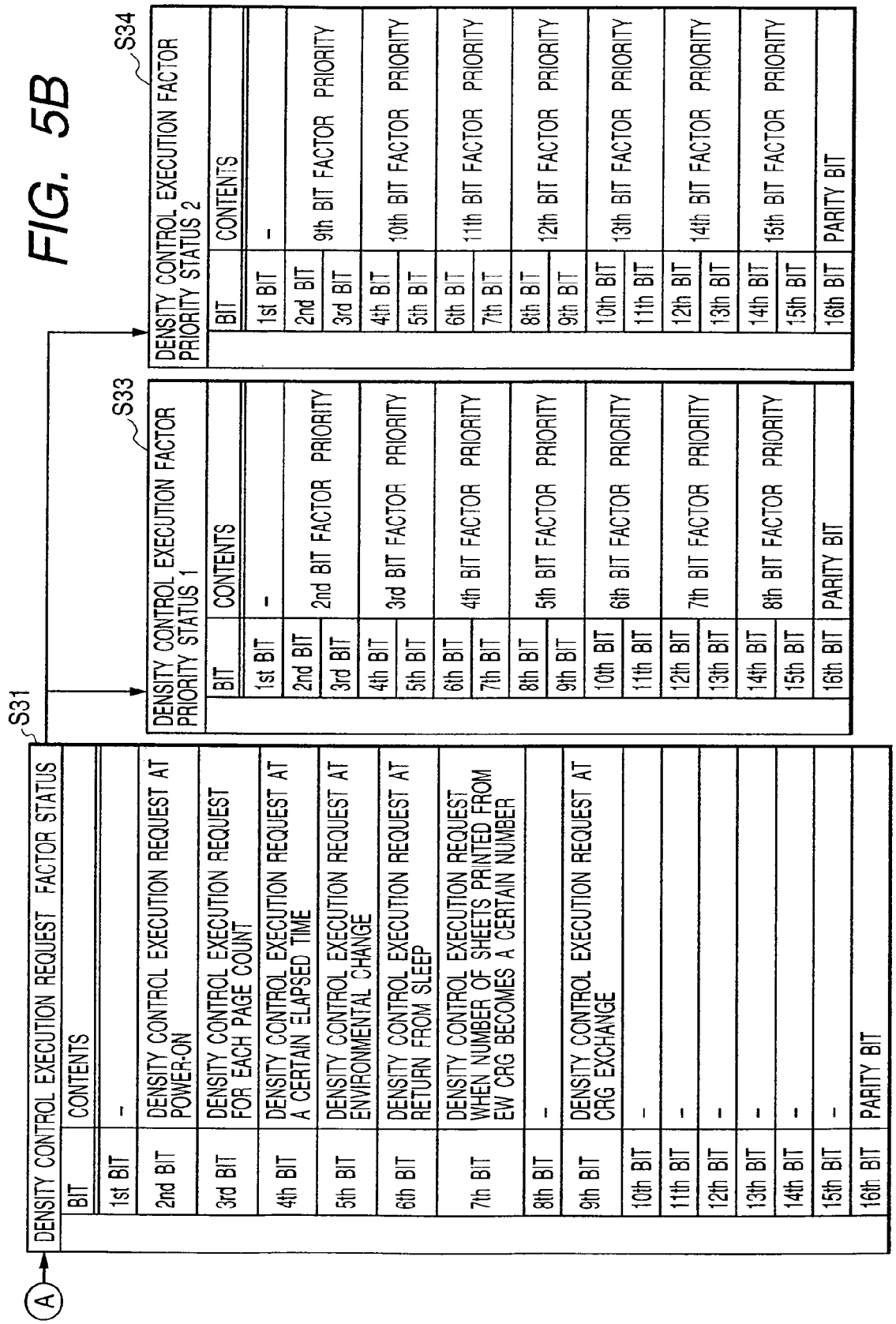

FIG. 5C

COLOR MISREGISTRATION AMOUNT MEASUREMENT EXECUTION REQUEST FACTOR STATUS ~S32

| BIT | CONTENTS |
|---|---|
| 1st BIT | — |
| 2nd BIT | COLOR MISREGISTRATION AMOUNT MEASUREMENT EXECUTION REQUEST AT POWER-ON |
| 3rd BIT | COLOR MISREGISTRATION AMOUNT MEASUREMENT EXECUTION REQUEST FOR EACH PAGE COUNT |
| 4th BIT | COLOR MISREGISTRATION AMOUNT MEASUREMENT EXECUTION REQUEST AT A CERTAIN ELAPSED TIME |
| 5th BIT | COLOR MISREGISTRATION AMOUNT MEASUREMENT EXECUTION REQUEST AT ENVIRONMENTAL CHANGE |
| 6th BIT | COLOR MISREGISTRATION AMOUNT MEASUREMENT EXECUTION REQUEST AT RETURN FROM SLEEP |
| 7th BIT | COLOR MISREGISTRATION AMOUNT MEASUREMENT EXECUTION REQUEST WHEN NUMBER OF SHEETS PRINTED FROM NEW CRG BECOMES A CERTAIN NUMBER |
| 8th BIT | — |
| 9th BIT | COLOR MISREGISTRATION AMOUNT MEASUREMENT EXECUTION REQUEST AT CRG EXCHANGE |
| 10th BIT | — |
| 11th BIT | — |
| 12th BIT | — |
| 13th BIT | — |
| 14th BIT | — |
| 15th BIT | — |
| 16th BIT | PARITY BIT |

FIG. 7

| DENSITY CONTROL EXECUTION REQUEST GENERATION FACTOR | PRIORITY |
|---|---|
| DENSITY CONTROL EXECUTION REQUEST AT POWER-ON | 2 |
| DENSITY CONTROL EXECUTION REQUEST FOR EACH PAGE COUNT | 1 |
| DENSITY CONTROL EXECUTION REQUEST AT A CERTAIN ELAPSED TIME | 0 |
| DENSITY CONTROL EXECUTION REQUEST AT ENVIRONMENTAL CHANGE | 1 |
| DENSITY CONTROL EXECUTION REQUEST AT RETURN FROM SLEEP | 0 |
| DENSITY CONTROL EXECUTION REQUEST WHEN NUMBER OF SHEETS PRINTED FROM NEW CRG BECOMES A CERTAIN NUMBER | 2 |
| DENSITY CONTROL EXECUTION REQUEST AT CRG EXCHANGE | 3 |

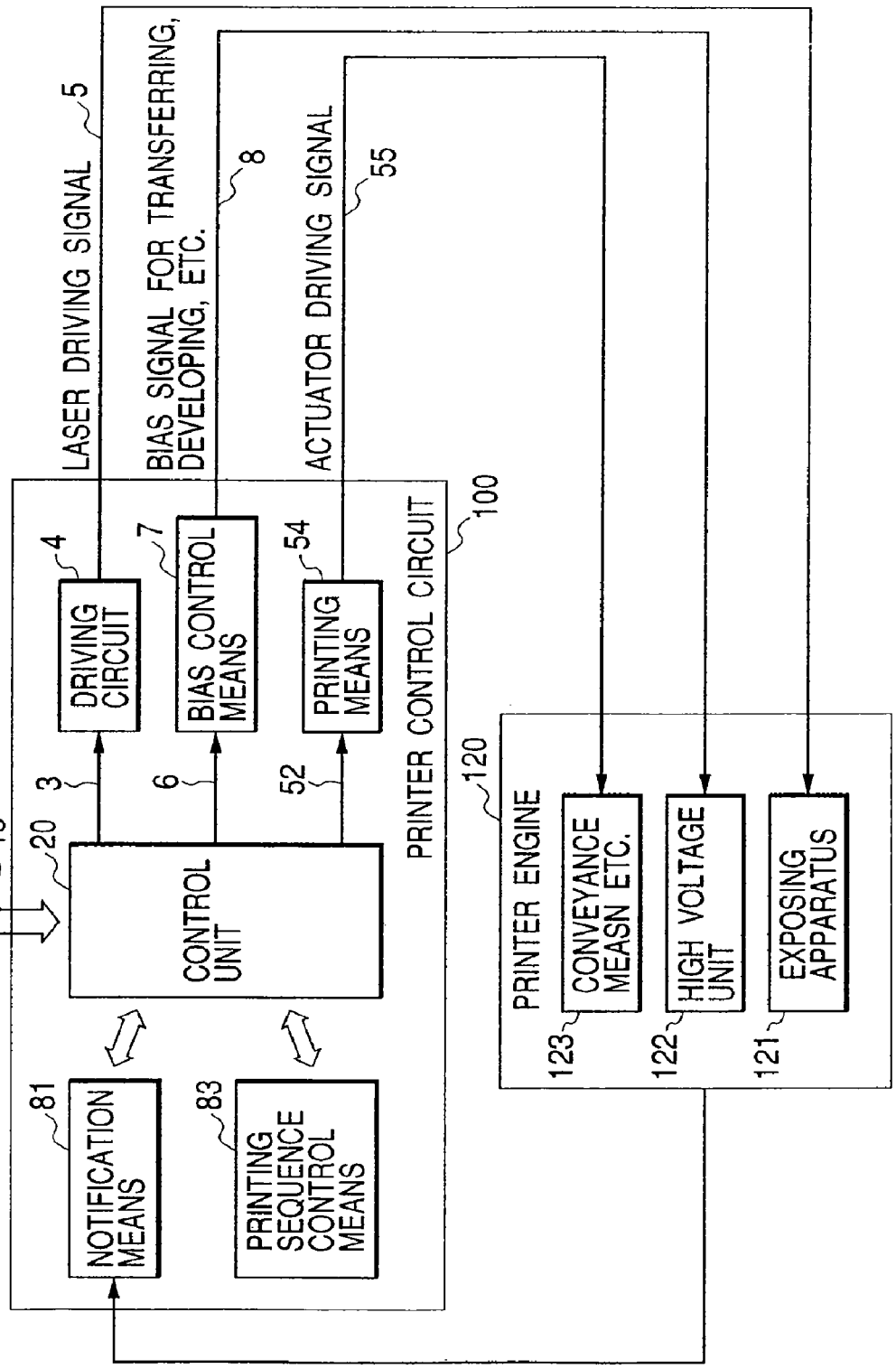

FIG. 10

| SIGNAL NAME | ABBRIVATION CODE | DIRECTION OF SIGNAL |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINT | /PRINT | CONTROLLER → PRINTER |
| TOP OF PAGE | /TOP | CONTROLLER ← PRINTER |
| LINE SYNCHRONIZATION | /LSYNC | CONTROLLER ← PRINTER |
| VIDEO CLOCK | /VCLK | CONTROLLER → PRINTER |
| IMAGE ENABLE | /VDOEN | CONTROLLER → PRINTER |
| IMAGE | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| SPEED CHANGE | /SPCHG | CONTROLLER ← PRINTER |
| PAPER DELIVERY | /PDLV | CONTROLLER ← PRINTER |
| TOP OF PAPER | /TOPR | CONTROLLER ← PRINTER |
| CONDITION CHANGE NOTIFICATION | /CCRT | CONTROLLER ← PRINTER |

PRINTER ENGINE HAVING A JUDGMENT UNIT AND A CONTROL UNIT THAT TRANSMITS TO A CONTROLLER

This application is a continuation of U.S. patent application Ser. No. 12/146,722, filed Jun. 26, 2008, which is a continuation of U.S. patent application Ser. No. 10/760,296, filed Jan. 21, 2004, which issued as U.S. Pat. No. 7,424,239 on Sep. 9, 2008.

BACKGROUND OF THE INVENTION

1. Field of the Invention

The present invention relates to an image forming apparatus and a control method for the same. More specifically, the invention relates to an image forming apparatus having a function of adjusting an image formation condition according to a change with time or an environmental change, and a control method for the same.

2. Related Background Art

Up to now, image forming apparatuses adopting an electrophotographic system etc., such as a printer and a copying machine perform image formation as follows. That is, a surface of a uniformly charged image bearing member is exposed to light by an exposing apparatus to form an electrostatic latent image. The electrostatic latent image on the image bearing member is developed with a toner to form a toner image. The toner image is transferred from the image bearing member onto a recording material such as recording paper. The toner image on the recording material is then applied with heat and pressure and fixed onto the recording material.

Here, each process for the image formation is appropriately controlled by control means provided inside the image forming apparatus and having a processor and input/output terminals for a signal.

A case of forming a multi-color image with the above image forming apparatus is assumed. A high voltage unit is provided in the apparatus, which is for applying a developing bias to a developing unit for developing the electrostatic latent image and a transfer bias to a transfer-charger according to the number of times the image is transferred in respective colors. The control means turns ON/OFF the high voltage unit in turn according to image formation cycles in multiple colors, thereby forming the multi-color image.

FIG. 8 is a block diagram illustrative of a printer control mechanism of the printer as the image forming apparatus.

In FIG. 8, reference numeral 3 denotes a video signal; 4, a driving circuit; 5, a laser driving signal; 6, an activation signal; 7, a bias control means; 8, a bias signal for transferring, developing, etc.; 18; a video interface; 20, a control unit; 52, a printing sequence signal; 54, a printing means; 55, an actuator driving signal; 81, a notification means; 83, a printing sequence control means; 100, a printer control circuit; 110, a printer controller; 120, a printer engine; 121, an exposing apparatus; 122; a high voltage unit; and 123, a conveyance means etc.

As shown in FIG. 8, the printer control circuit 100 is electrically connected with the printer controller 110 for processing image data etc. or processing internal information of the printer etc.

At the time of forming the image, a multi-color image signal is transmitted from the printer controller 110 to the printer control circuit 100. The control unit 20 provided inside the printer control circuit 100 then generates the video signal 3 according to the transmitted image signal and outputs the signal to the driving circuit 4.

The driving circuit 4 is used for driving a semiconductor laser and allowed to output the laser driving signal 5 to the exposing apparatus 121.

Also, the printing means 54 connected to the control unit 20 outputs the actuator driving signal 55 for driving actuators such as a motor, a clutch, and a solenoid, according to the printing sequence signal 52 from the control unit 20 or sensor information, thereby actuating the conveyance means etc. 123 for conveying the recording paper.

The control unit 20 outputs a first video signal and a second video signal generated according to the multi-color image signal via the driving circuit 4 to form a first electrostatic latent image and a second electrostatic latent image on the image bearing member (not shown). At the same time, the control unit outputs the activation signal 6 to the bias control means 7.

In response to the activation signal, the bias control means 7 outputs the bias signal 8 to the high voltage unit 122 used for a transfer or development operation according to the activation signal, with which the electrostatic latent image is developed and the toner image is transferred onto the recording paper. Thus, the multi-color image can be formed.

Further, the printing sequence control means 83 connected to the control unit 20 sends to the control unit 20 a printing sequence for processing accompanied with the detection of information on an open/close state of a printer cover or for a normal print operation.

Also, the notification means 81 connected to the control unit 20 notifies the printer controller 110 of the information of the printer engine 120 at the image formation time as a status, via the video interface 18 connecting between the printer control circuit 100 and the printer controller 110.

Next, referring to FIGS. 9 and 10, signals of the video interface 18 are described.

FIGS. 9 and 10 show the signals of the video interface in detail.

In particular, FIG. 9 shows typical signals transferred between the printer controller 110 and the printer control circuit 100.

In the figures, symbol "/" prefixed to an abbreviation code for each signal name means that the signal is a negative logic signal.

Printer power ready signal "/PPRDY": a signal indicating that a printer apparatus is ready to communicate after being initialized etc. through power-on. The signal is transmitted from the printer control circuit 100 to the printer controller 110.

Controller power ready signal "/CPRDY": a signal indicating that the printer controller 110 is ready to communicate after being initialized etc. through power-on. The signal is transmitted from the printer controller 110 to the printer control circuit 100.

Ready signal "/RDY": a signal indicating that a print operation is allowed to start in response to a signal "/PRNT" requesting the apparatus to start the print operation as described below. The signal is transmitted from the printer control circuit 100 to the printer controller 110. This signal can be set to "truth" with the proviso that each portion of the printer normally operates, for example, an inner temperature of a fixing apparatus reaches a predetermined temperature; no recording paper remains inside the printer; or a polygon mirror rotates at a given speed.

Print signal "/PRNT": the signal requesting the apparatus to start or continue the print operation. The signal is transmitted from the printer controller 110 to the printer control circuit 100.

Top of page signal "/TOP": a synchronization signal as a reference for vertical scanning of the image. The signal is output from the printer control circuit 100 a certain time period after the signal "/PRNT" is output from the printer controller 110.

Line synchronization signal "/LSYNC": a synchronization signal as a reference for horizontal scanning of the image. The signal is, similarly to the signal "/TOP", output from the printer control circuit 100 a certain time period after the signal "/PRNT" is output from the printer controller 110.

Video clock signal "/VCLK": a synchronous clock synchronized with signals "/VDOEN" and "/VDO" described below. The signal is generated by the printer controller 110.

Image enable signal "/VDOEN": a signal for inputting the image signal "/VDO" output from the printer controller 110 to the printer control circuit 100. The printer control circuit 100 detects whether the signal "/VDOEN" is set to truth or false in synchronization with the signal "/VCLK", and inputs the image signal "/VDO" in the case of truth but does not input the image signal "/VDO" in the case of false.

Image signal "/VDO": image data output from the printer controller 110 and synchronized with the signal "/VCLK" with the signal "/TOP" as a reference (in a vertical direction of the image) and with the signal "LSYNC" as a reference (in a horizontal direction thereof). Thus, the signal "/VDO" is output.

Controller clock signal "/CCLK": a command serial-transferred from the printer controller 110 to the printer control circuit 100 and a synchronous clock for a status serial-transferred to the printer controller 110 from the printer control circuit 100. The signal is output from the printer controller 110.

Command signal "/CMD": a signal used for the printer controller 110 to serial-transfer the information to the printer control circuit 100, the information being called the "command".

Command busy signal "/CBSY": a signal indicating to the printer control circuit 100 that the printer controller 110 serial-transfers the command using the signal "/CMD".

Status signal "/STS": a signal used for the printer control circuit 100 to serial-transfer the information to the printer controller 110, the information being called the "status".

Status busy "/SBSY": a signal indicating to the printer controller 110 that the printer control circuit 100 serial-transfers the status using the signal "/STS".

Condition change notification "/CCRT": a signal for notifying the printer controller 110 that the status inside the printer changes. The printer controller 110 issues, after receiving the signal, the command for inquiring of the printer control circuit 100 which condition is changed on the printer engine 120 side, using the signal "/CMD". The printer control circuit 100 replies to the command using the signal "/STS".

The signal "/CCRT" is inverted to truth when any change occurs in the printer condition previously designated by the printer controller 110.

Other signals such as speed change "/SPCHG", paper delivery "/PDLV", and top of paper "/TOPR" are also cited.

Next, referring to FIG. 11, a timing of each signal at the time of using the signal "/CCRT" is described.

FIG. 11 is a timing chart showing an example of a timing of each signal at the time of using the signal "/CCRT".

FIG. 11 shows a case where the signal "CCRT" is set to truth when the printer controller 110 sends the signal "/CMD" indicating "no sheet", for instance.

In this case, for example, if only one recording sheet remains in a recording paper cassette but the printer controller 110 makes a request that two sheets are printed, the first sheet may be printed without fail; however, at the beginning of the image formation for the second sheet, the printer control circuit 100 detects the condition change, i.e., "no sheet" and changes the signal "/CCRT" from false to truth as shown in FIG. 11.

As soon as the printer controller 110 detects that the signal "/CCRT" is changed to truth, the controller performs the following operation in order to ascertain which feeding cassette comes into the condition of "no sheet". That is, as shown in FIG. 11, the controller changes the signal "/CBSY" to truth and issues the command that requests the printer control circuit 100 to send the status indicating whether or not the recording paper remains in the feeding cassette using the signal "/CMD". As shown in FIG. 11, in response to the command, the printer control circuit 100 changes the signal "/SBSY" to truth and sends the status indicating whether or not the recording paper remains in the recording paper cassette using the signal "/STS".

Note that, the state of the signal "/CCRT" is cleared to false at a timing where the signal "/SBSY" is changed to truth, which indicates that the status is transferred.

Next, referring to FIG. 12, the transfer of the command/status between the printer controller 110 and the printer control circuit 100 is described.

FIG. 12 is a sequence chart showing a transfer example of the command/status between the printer controller 110 and the printer control circuit 100 on the assumption that a color image is formed.

When the printer is instructed to start the print operation, the printer controller 110 performs image processing etc. while issuing a command to the printer control circuit 100 to check whether or not the printer is in a ready condition.

Subsequently, the controller issues a command to designate the feeding cassette and further, a command to request a desired size of the recording paper received in the designated feeding cassette.

Next, the printer controller 110 issues a command to designate a desired discharge port, a page mode designation command to designate a desired number of pages for image formation, and a command to designate either monochrome or color image formation. Thus, the designation is completed for all items.

The printer control circuit 100 replies to a series of commands and sends the corresponding status.

After that, the printer controller 110 generates the signal "/PRNT". In response to the signal, the printer control circuit 100 returns the signal "/TOP" after a predetermined time period.

The signal "/VDO" synchronous with the signal "/TOP" in the vertical scanning and with the signal "/LSYNC" in the horizontal scanning is synchronized with the signal "/VCLK" and transferred to the printer control circuit 100.

Note that if the color mode is set, the signal "/TOP" requests the printer to start forming an image for each color component. Therefore, if the signal "/TOP" is generated four times, the image in four colors C, M, Y, and K can be formed.

After the final signal "/TOP" is generated, the printer controller 110 restores the signal "/PRNT" to false.

From the above, the printer control circuit 100 detects that the requested print operation is completed. The processing is shifted to post-processing such as cleaning of each portion.

On the other hand, the recording paper onto which the toner image is transferred is discharged from the designated discharge port after passing through a fixing roller.

Finally, the printer controller 110 confirms, based on the status sent from the printer control circuit 100 that the conveyance (discharge) of the recording paper is completed.

When the discharge completion is confirmed, a print job is finished, allowing the printer controller 110 to wait for a next print request in a ready condition.

During the above print operation, if illegal conditions occur, for example, the recording paper is jammed or used up, or users open the printer apparatus cover, the printer control circuit 100 immediately notifies the printer controller 110 that the printer is in an abnormal condition using the signal "/CCRT".

Then, the printer controller 110 identifies the generated abnormality from the status sent in response to the command and conducts the processing according to the abnormality.

In the above printer engine 120, in particular, printer engine for outputting the color image, a density of an output image or a density balance is gradually varied along with an increase in the number of output sheets or according to an environmental change, although the variation is not suddenly caused.

Similarly, regarding a color misregistration of the formed image, a phase shift of a developing drum, or the like, the conditions for the image formation are not always optimum depending on whether or not the user exchanges the cartridge, the environmental change, the change with time, or other factors.

Thus, by monitoring whether or not the cartridge is exchanged, the elapsed time, the number of output sheets, and the environmental change, those conditions for the image formation are adjusted to optimum ones (see Japanese Patent Application Laid-Open No. 2002-29092, for example).

Hereinafter, the sequence of judging whether to execute those adjustments or not by the printer engine 120 and the printer controller 110 is explained while focusing on a density control by way of example.

The printer engine 120 capable of outputting the color image cannot output an appropriate image particularly at the time of forming the color image, unless the color components Y, M, C, and K used for the image formation are well-balanced in density.

The reason the density balance is lost is that a residual charge of a photosensitive member increases due to the repetitive image formation or that a humidity and a temperature of the environment surrounding the apparatus are changed, for instance. Under the conditions in an initial application range, the appropriate image formation cannot be performed.

To cope therewith, a change of some factors whereby the density balance is lost is detected to make a control for keeping densities in balance.

Examples of the factor as a detection target include: factors "continuous rest time in a stand-by condition", "the number of discharged recording sheets" (hereinafter, referred to as "accumulated sheets number" in some cases), and "the number of images formed on an intermediate transfer member" (hereinafter, referred to as "accumulated images number" in some cases), all of which are detected by a CPU (not shown) mounted to the printer control circuit 100; and a change in temperature or humidity detected by the CPU (in the printer control circuit 100) monitoring the input from an environmental sensor disposed inside the printer apparatus.

Next, referring to FIG. 13, a judgement of whether to control the density or not by the printer control circuit 100 is explained.

FIG. 13 is a flowchart showing a control sequence for judging whether to control the density or not by the printer control circuit 100. The CPU in the printer control circuit 100 executes the sequence, which always monitors the change of the factors as the detection target.

In step S161, judgement is made of whether or not the accumulated sheets number/accumulated images number reached a predetermined value at which the density control execution was necessary; in step S162, judgement is made of whether or not the continuous rest time reached a predetermined value at which the density control execution was necessary. In step S163, the judgement is made of whether or not the change in environmental condition such as a temperature or a humidity reached the level at which the density control execution was necessary.

If it is judged that the density control is necessary, the printer control circuit 100 notifies the printer controller 110 that it is necessary to execute the density control using the signals "/CCRT" and "/STS" (step S164).

Next, in step S165, the printer control circuit waits for an instruction to execute the density control from the printer controller 110 and starts the density control in step S166 immediately after receiving the instruction.

In general, employed are the plural factors whereby the judgement is made of whether to perform various adjustments or not. In some cases, the factors are classified into two types: a factor whereby the adjustment is judged indispensable in order to meet a specification regarding the output image quality; and a factor whereby the adjustment is optionally judged necessary for the purpose of setting the optimum image formation conditions at the time to further improve the output image quality.

Meanwhile, as exemplified above, the judgement is made of whether to execute the various adjustments or not inside the printer control circuit. Thus, the printer controller 110 cannot guess which factor suggests the necessity of the adjustment.

Therefore, when the printer control circuit 100 notifies the printer controller 110 that it is necessary to execute the adjustment according to the above sequence, the printer controller 110 instructs the printer control circuit to execute the necessary adjustment without fail.

In general, the execution sequence of the adjustments requires several tens of seconds to several minutes, during which the user cannot obtain a print output.

As a result, the adjustment sequence is executed, which is unnecessary for the user who demands a high image output speed or response speed rather than the high output image quality.

SUMMARY OF THE INVENTION

The present invention has been made in the light of the above-mentioned problems and has an object to provide an image forming apparatus and a control method for the same; with which an adjustment for satisfying an image quality is performed without fail while an execution frequency of the adjustment can be changed, for example, an unnecessary adjustment can be skipped depending on user-established conditions.

Hereinbelow, a feature of the present invention is described.

According to one aspect of the present invention, an image forming apparatus includes: a controller for issuing commands representative of a plurality of kinds of instruction; an engine for executing image formation according to the command; a control portion for holding a condition status indicating an internal condition of the engine and a factor status indicating a factor of the condition status, or the factor status and notifying, in response to the command, the condition status and the factor status, or the factor status; and judgement means for judging whether to adjust an image formation condition of the engine or not according to the condition status and the factor status, or the factor status.

In further aspect of the image forming apparatus, the control portion further holds a priority status indicating a priority of the factor, and the judgement means judges whether to adjust the image formation condition of the engine or not according to the condition status, the factor status, and the priority status, or the factor status and the priority status.

According to another aspect of the invention, an image forming apparatus includes: a controller for issuing a plurality of commands; an engine for executing image formation according to the command; a control portion for holding a condition status indicating an internal condition of the engine and notifying the controller of the condition status in response to the command; necessity judgement means for judging whether to adjust an image formation condition of the engine or not based on the condition status; and adjustment means for adjusting the image formation condition of the engine, and in the image forming apparatus, the control portion holds a factor status by which, when the necessity judgement means judges that a necessity is admitted for an adjustment of the image formation condition, whether or not the necessity involves immediate adjustment is judged and which indicates a factor of the condition status.

In further aspect of the image forming apparatus, the controller includes adjustment execution judgement means for judging whether or not the necessity involves the immediate adjustment based on the factor status, and when the adjustment execution judgement means judges that the necessity involves the immediate adjustment, the controller issues an adjustment execution command to the adjustment means.

In further aspect of the image forming apparatus, the control portion holds a priority status indicating a priority regarding the adjustment execution of the image formation condition according to each factor.

In further aspect of the image forming apparatus, the adjustment execution judgement means judges that the immediate adjustment is necessary when the priority of the factor regarding the necessity is higher than a predetermined value.

In further aspect of the image forming apparatus, the image formation condition is related to a density control of an image.

In further aspect of the image forming apparatus, the image formation condition is related to a color component balance of a color image.

In further aspect of the image forming apparatus, the image formation condition is related to a color misregistration amount of a color image.

In further aspect of the image forming apparatus, the image formation condition is related to a shift amount of drum phases in multiple colors of a color image.

According to another aspect of the invention, a control method for an image forming apparatus, includes: notifying a condition status indicating an internal condition of an engine and a factor status indicating a factor of the condition status, or the factor status; and judging whether to adjust an image formation condition of the engine or not according to the notified condition status and factor status, or the notified factor status.

According to another aspect of the invention, a control method for an image forming apparatus, includes: notifying a condition status indicating an internal condition of an engine, a factor status indicating a factor of the condition status, and a priority status indicating a priority of the factor, or the factor status and the priority status; and judging whether to adjust an image formation condition of the engine or not according to the notified condition status, factor status, and priority status, or the notified factor status and priority status.

According to another aspect of the invention, a control method for an image forming apparatus, includes: issuing a plurality of commands using a controller; notifying a condition status indicating an internal condition of an engine in response to the command; judging whether to adjust an image formation condition of the engine or not based on the condition status; and notifying a factor status by which, when a necessity is judged admittable for an adjustment of the image formation condition, whether or not the necessity involves immediate adjustment is judged and which indicates a factor of the condition status.

In further aspect of the control method for an image forming apparatus, the control method further includes: judging whether or not the necessity involves the immediate adjustment based on the factor status and executing the adjustment when the necessity is judged to involve the immediate adjustment.

In further aspect of the control method for an image forming apparatus, the control method further includes: notifying, when the necessity is judged admittable for the adjustment of the image formation condition, a priority status indicating a priority regarding adjustment execution of the image formation condition according to each factor.

In further aspect of the control method for an image forming apparatus, the control method further includes: judging that the immediate adjustment is necessary when the priority of the factor regarding the necessity is higher than a predetermined value.

In further aspect of the control method for an image forming apparatus, the image formation condition is related to a density control of an image.

In further aspect of the control method for an image forming apparatus, the image formation condition is related to a color component balance of a color image.

In further aspect of the control method for an image forming apparatus, the image formation condition is related to a color misregistration amount of a color image.

In further aspect of the control method for an image forming apparatus, the image formation condition is related to a shift amount of drum phases in multiple colors of a color image.

That is, when notifying a controller that the adjustment is necessary, an engine notifies the controller of a factor whereby the adjustment is judged necessary, or the factor whereby the adjustment is judged necessary and a factor priority thereof as a status of the engine to thereby achieve the above-mentioned object.

Other objects, structures, and effects of the preset invention will be apparent upon reading the following detailed description in conjunction with the accompanying drawings.

BRIEF DESCRIPTION OF THE DRAWINGS

FIG. 7 shows a table example illustrative of a correspondence between a factor whereby it is necessary to execute the density control and a factor priority thereof in the image forming apparatus according to the second embodiment of the preset invention;

FIG. 8 is a block diagram illustrative of a printer control mechanism of a printer as the image forming apparatus;

FIG. 10 shows the signals of the video interface in detail;

DESCRIPTION OF THE PREFERRED EMBODIMENTS

Figure 1:
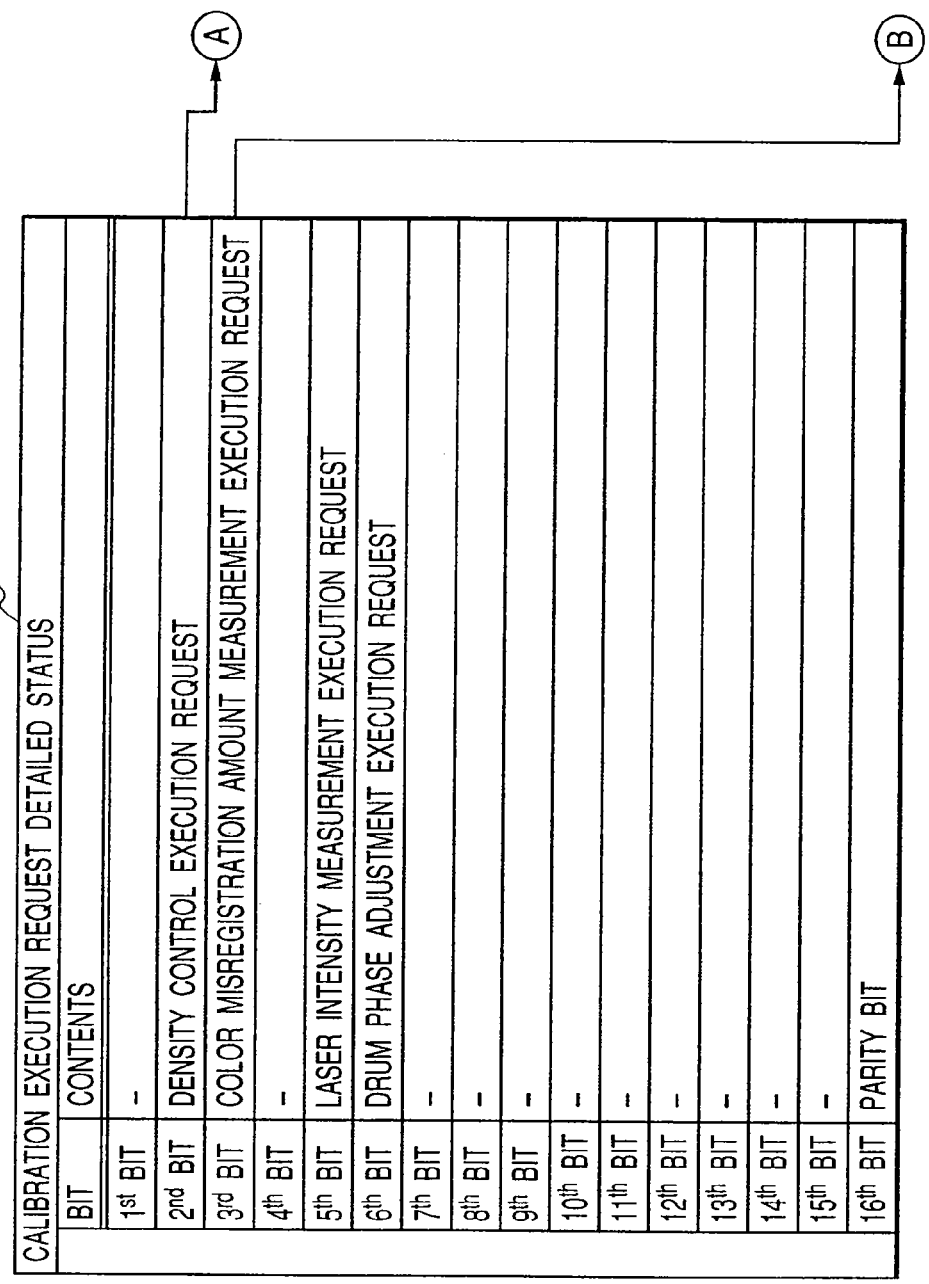
FIG. 1 is comprised of FIGS. 1A, 1B and 1C showing conceptual diagrams of a status regarding whether to execute an adjustment or not in an image forming apparatus according to a first embodiment of the present invention.

Hereinafter, embodiments of the present invention will be described with reference to the accompanying drawings.

First Embodiment

Referring to FIGS. 1A to 1C, 2, 3, and 8, a first embodiment of the present invention is described.

A structure of the first embodiment is almost the same as in a conventional example and thus is described referring to FIG. 8.

Note that the same components are denoted by the same reference numerals and detailed description thereof is omitted here.

Reference numeral 100 denotes a printer control circuit as a control portion.

The printer control circuit 100 includes a CPU (not shown) as necessity judgement means in a control unit 20.

Here, the necessity judgement means is not limited to the CPU but may be provided independently of the control unit 20 or the control portion 100.

Reference numeral 110 denotes a printer controller as a controller.

The printer controller 110 includes a CPU (not shown) that doubles as judgement means and adjustment execution judgement means and adjustment means (not shown).

Here, the judgement means or the adjustment execution judgement means is not limited to the CPU but may be provided independently of the printer controller 110.

Further, the adjustment means (not shown) may be provided independently of the printer controller 110.

Reference numeral 120 denotes a printer engine as an engine.

FIGS. 1A to 1C are a conceptual diagram of a status regarding whether to execute the adjustment or not among information of conditions (hereinafter, referred to as statuses) of the printer engine 120 stored in a storage device (not shown) such as a RAM in the printer control circuit 100.

Figure 2:
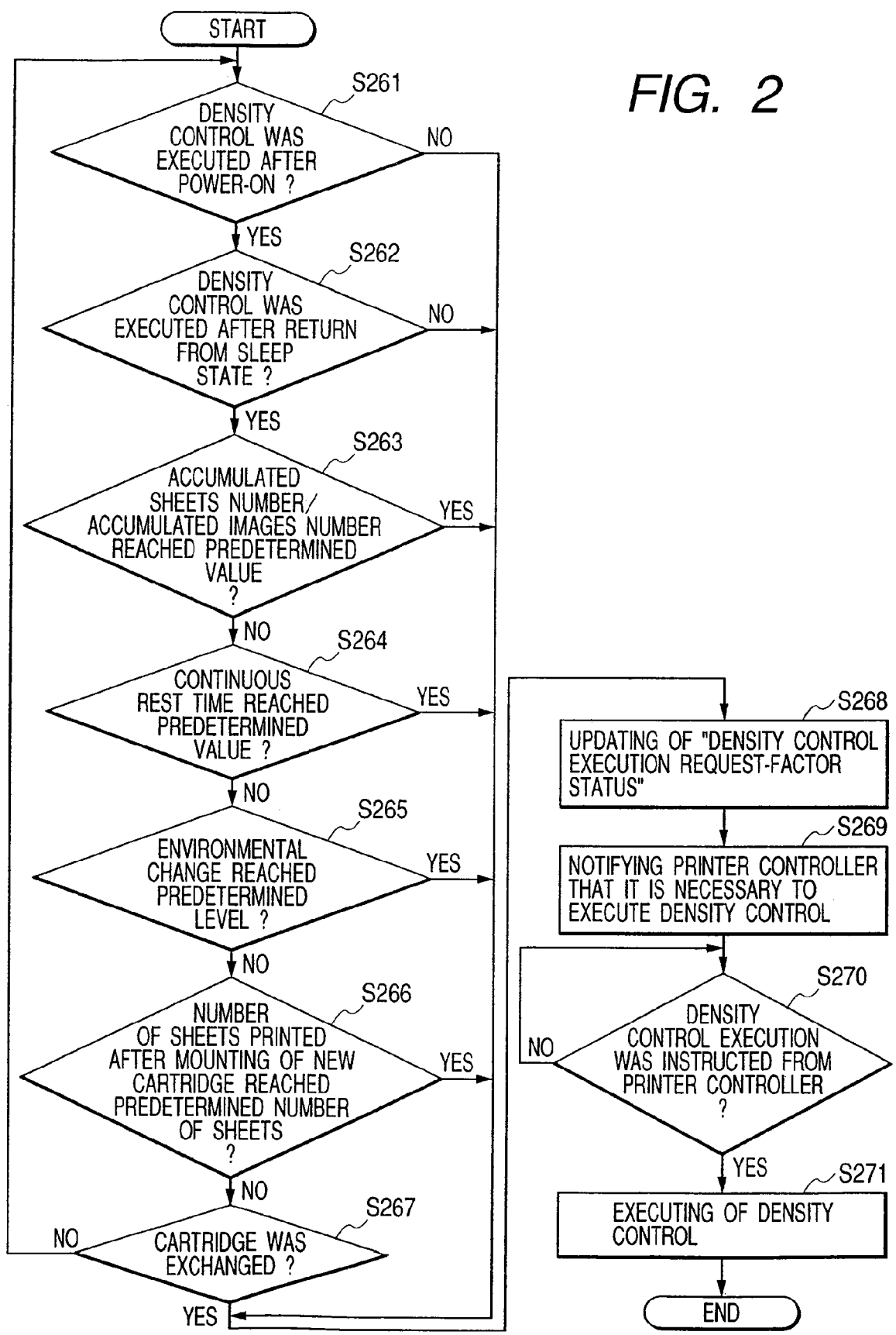
FIG. 2 is a flowchart showing a control sequence regarding a judgement as to whether to execute a density control or not and execution thereof in a control circuit of the image forming apparatus according to the first embodiment of the present invention.

FIG. 2 is a flowchart showing a control sequence regarding a judgement as to whether to execute a density control or not and execution thereof using the printer control circuit 100 in the image forming apparatus according to the first embodiment of the present invention. The sequence is executed by the CPU (not shown) in the printer control circuit 100 that monitors a change of a factor as a detection target all the time.

Figure 3:
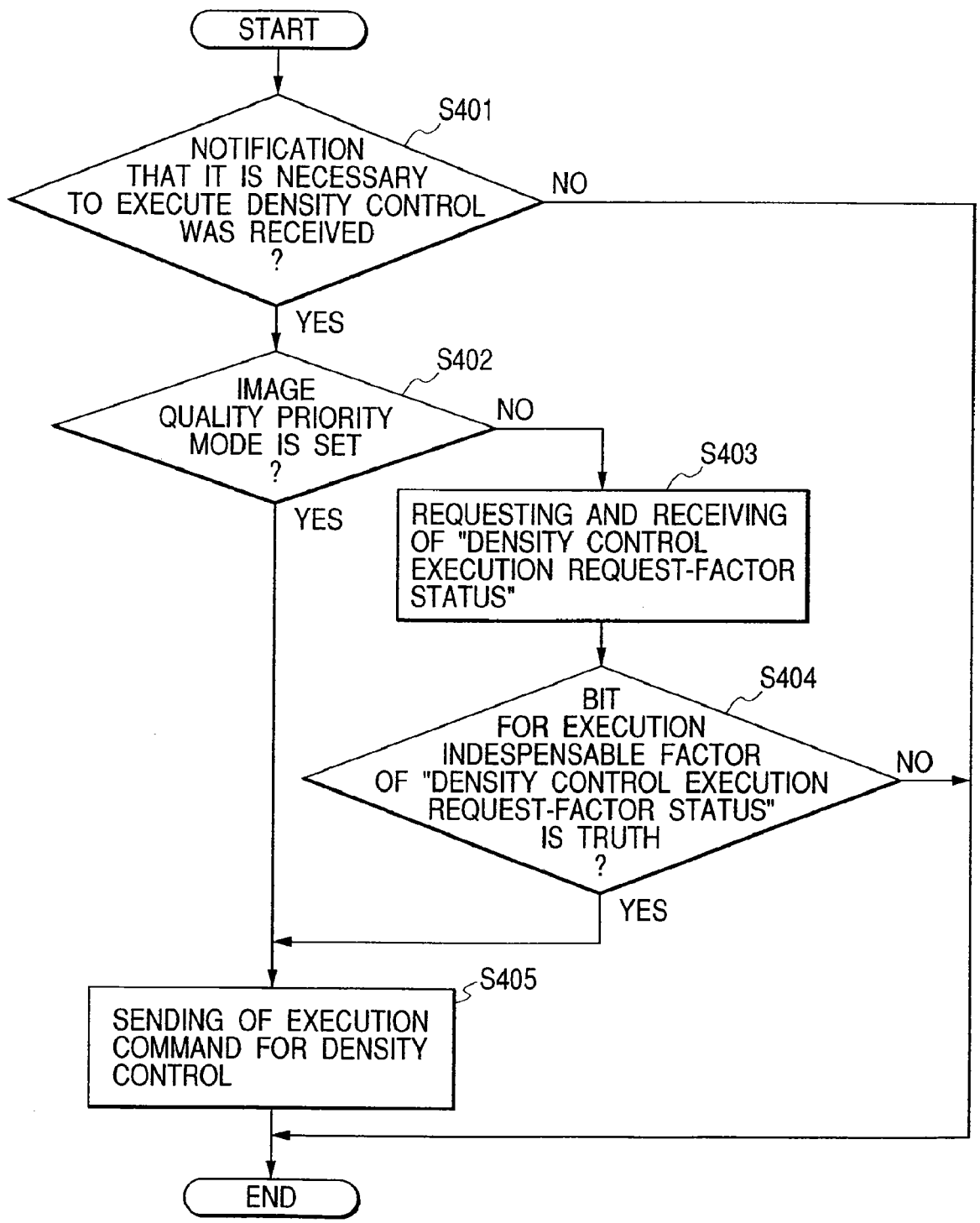
FIG. 3 is a flowchart showing a control sequence regarding a judgement as to whether to issue an instruction to execute a density control or not in the image forming apparatus according to the first embodiment of the present invention.

FIG. 3 is a flowchart showing a control sequence regarding a judgement as to whether to issue an instruction to execute a density control or not using the printer controller 110. The sequence is executed by the CPU (not shown) in the printer controller 110.

Here, denoted by S30 is a condition status indicating which type of adjustment the printer engine 120 requires to be executed at this time.

Denoted by S31 and S32 are factor statuses indicating which factor is used for judgement as to whether to execute a density control or color misregistration amount measurement or not.

Hereinbelow, the control sequence regarding the judgement as to whether to execute the density control or not and the execution thereof will be described.

As shown in FIG. 2, the CPU (not shown) in the printer control circuit 100 first judges, in step S261, whether or not the density control was executed after the power to the printer turned on and judges that it is necessary to execute the density control if the control was not executed at all. Then, processing advances to step S268.

In step S262, the CPU judges whether or not the density control was executed after the printer returned from a sleep state to a normal stand-by state and judges that it is necessary to execute the density control if the control was not executed at all. Then, the processing advances to step S268.

In step S263, the CPU judges whether or not an accumulated sheets number/accumulated images number reached a predetermined value at which the density control execution was necessary. If the value was reached, the processing advances to step S268.

In step S264, the CPU judges whether or not a continuous rest time reached a predetermined value at which the density control execution was necessary. If the value was reached, the processing advances to step S268.

In step S265, the CPU judges whether or not a change of environmental conditions such as a temperature or humidity reached a predetermined level at which the density control execution was necessary. If the level was reached, the processing advances to step S268.

Further, in step S266, the CPU judges whether or not the number of sheets printed after mounting of a new cartridge reached a predetermined number of sheets at which the density control execution was necessary. If it reached the predetermined number of sheets, the processing advances to step S268.

In step S267, the CPU judges whether or not the cartridge was exchanged and, if exchanged, judges that it is necessary to execute the density control since the control was not executed at all after the exchange. The processing advances to step S268.

In step S267, if the cartridge was not exchanged, the progressing returns back to step S261.

In any of steps S261 to S267, when it is judged that the density control execution is necessary, in step S268, a bit corresponding to the factor whereby the density control is necessary in the density control execution request-factor status S31 shown in FIGS. 1A to 1C are set to truth. Subsequently, in step S269, the CPU notifies the printer controller 110 that it is necessary to execute the density control using the signals "/CCRT" and "/STS".

Next, in step S270, the CPU waits for the printer controller 110 to issue an instruction to execute the density control (adjustment execution command) and starts the density control using the adjustment means (not shown) immediately after the density control execution (adjustment execution command) was instructed (step S271).

On the other hand, in step S401, as shown in FIG. 3, the CPU (not shown) of the printer controller 110 judges whether or not the notification to the effect that it is necessary to execute the density control was received. When the notification to that effect was received, the processing advances to step S402; otherwise the control sequence regarding the judgement as to whether to issue an instruction to execute the density control or not is ended.

In step S402, it is confirmed whether or not an image quality priority mode is set to the printer at this time.

When the image quality priority mode is set, the processing advances to step S405 regardless of which factor suggests the necessity of the density control execution. In step S405, an execution command for density control (adjustment execution command) is surely sent.

Note that, the image quality priority mode may be set arbitrarily by the user with a printer setting panel or with driver setting on a host computer side.

If the image quality priority mode is not set, the processing advances to step S403 where the CPU requests the printer control circuit 100 to return the "density control execution request-factor status S31" and receives the status.

The processing then advances to step S404 where it is judged whether or not a bit for execution indispensable factor of the "density control execution request-factor status S31" is truth.

If the bit for execution indispensable factor of the "density control execution request-factor status S31" is truth, the processing advances to step S405, whereas if the bit is false, the control sequence regarding whether to issue an instruction to execute the density control or not is ended.

More specifically, in step S403, the factor whereby it is necessary to execute the density control is acquired from the received "density control execution request-factor status S31", and it is judged whether or not the density control execution is indispensable at the present moment for meeting the specification regarding the output image quality in step S404.

For example, assuming the specification that "the image quality cannot be guaranteed unless the density control is executed upon exchanging the cartridge", if the 9th bit (density control execution request at CRG exchange) of the "density control execution request-factor status S31" is truth, the CPU (not shown) of the printer controller 110 judges that it is indispensable to execute the density control.

Alternatively, assuming the specification that "the density control is desirably executed after a certain time period elapses", if the 4th bit (density control execution request at a certain elapsed time) of the "density control execution request-factor status S31" is truth but the image quality priority mode is not set, the CPU (not shown) of the printer controller 110 judges that it is unnecessary to execute the density control at the present moment.

Needless to say, the case is conceivable in which the plural bits of the "density control execution request-factor status S31" are truth. However, any of the bits correspond to the density control execution indispensable factors, the CPU judges that it is necessary to execute the density control.

In step S404, when it is judged that the density control execution is necessary, the CPU sends an execution command for density control (adjustment execution command) to the printer control circuit 100 in step S405.

As described above, according to this embodiment, when the printer engine 120 requires the adjustment execution, the CPU (not shown) of the printer controller 110 is notified of the factor statuses S31 and S32 that indicate which factor suggests the necessity of the adjustment execution concerned. Consequently, the CPU (not shown) of the printer controller 110 can make a selection as to whether to issue an instruction to execute the adjustment or not at that point.

Accordingly, an image forming apparatus and a control method for the same can be provided, with which while satisfying the image quality at the minimum level, the adjustment execution frequency can be set by the user. For example, when the user sets the mode to the output image quality priority mode, the adjustment is executed without fail each time it is notified that the adjustment execution is necessary; otherwise the adjustment execution is not instructed unless being indispensable, even when it is notified that the adjustment execution is necessary.

Note that in this embodiment, the description has been made of the judgements as to whether to execute the density control inclusive of density reproduction or not and whether to issue an instruction to execute the density control or not. Needless to say, however, the same is applicable to a color component balance of a color image, color misregistration amount (shift amount of drum phases in respective colors of the color image) measurement, or other adjustments.

Also, the structure concerning the factors that suggest the necessity of the execution of the various adjustments and concerning which factor serves as the adjustment execution indispensable factor as described in this embodiment is only a structure example of the image forming apparatus of this embodiment. The above may be varied according to the structure of the image forming apparatus to which the present invention is applied.

Also, the image quality priority mode in this embodiment is adopted by way of example in this embodiment; there may include the settings on the image quality and the execution frequency of the various adjustments programmed by the user or with the printer controller 110 or the printer engine 120.

Also, in this embodiment, the case of judging whether to execute the adjustment of the image formation conditions or not using the condition status S30 and the factor statuses S31 and S32 has been described. However, the present invention is not limited thereto but it is possible to judge whether to execute the adjustment or not only using the factor statuses S31 and S32.

For example, a table showing a correspondence between the factor statuses S31 and S32 and the required adjustments is prepared in advance in the printer controller 110 etc., so that the above can be attained.

Second Embodiment

In the first embodiment, the mode has been described in which the factors whereby it is judged necessary to execute the various adjustments are held as the factor statuses S31 and S32 and it is judged whether or not the adjustment execution is indispensable according to the factor.

In a second embodiment, regarding the factor statuses S31 and S32 for the factors whereby it is judged necessary to execute the various adjustments, the case of additionally holding a priority status indicating the priority of the factors will be described.

Note that the same parts as in the conventional example and the first embodiment are denoted by the same reference symbols and detailed description thereof is omitted here.

Figure 4:
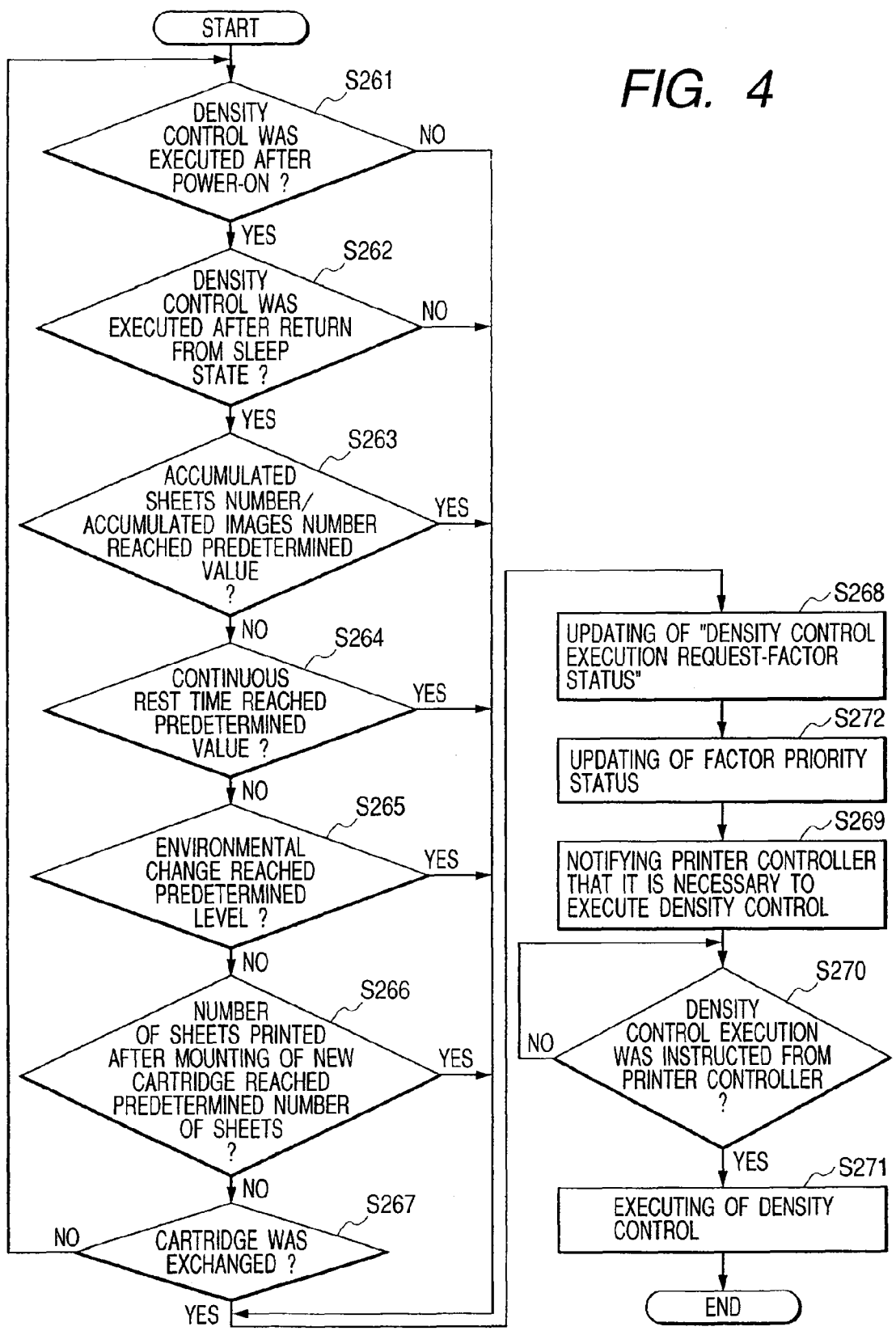
FIG. 4 is a flowchart showing a control sequence regarding a judgement as to whether to execute a density control or not and execution thereof in an image forming apparatus according to a second embodiment of the present invention.

FIG. 4 is a flowchart showing a control sequence regarding a judgement as to whether to execute a density control or not and execution thereof using the CPU (not shown) of the printer control circuit 100 in an image forming apparatus according to the second embodiment of the present invention. The flowchart of FIG. 4 differs from that of FIG. 2 used in the first embodiment in that step S272 is added.

Figure 5A:
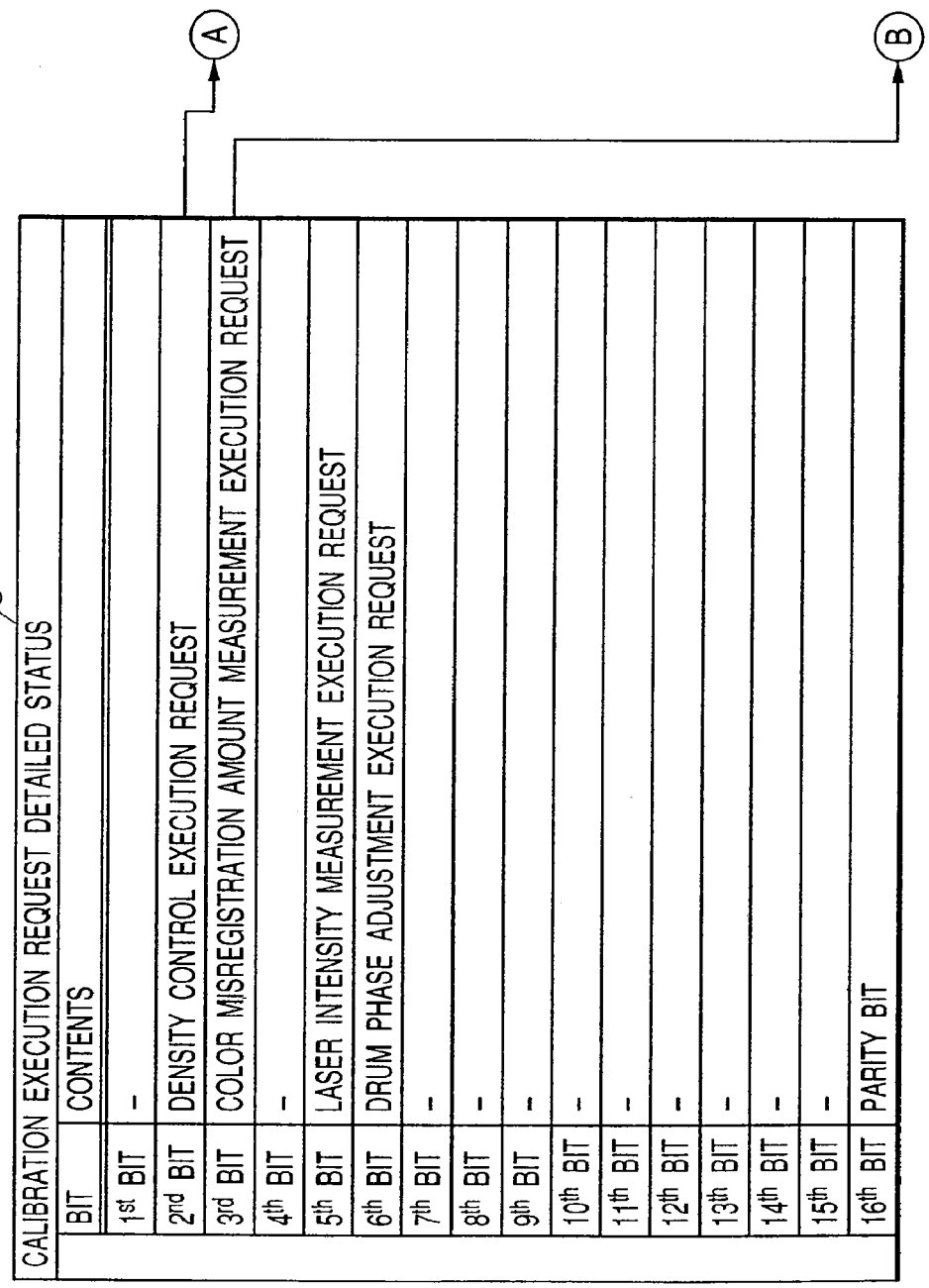
FIG. 5 is comprised of FIGS. 5A, 5B and 5C showing conceptual diagrams of a status regarding whether to execute an adjustment or not in the image forming apparatus according to the second embodiment of the present invention.

FIGS. 5A to 5C are a conceptual diagram of a status regarding whether to execute an adjustment or not among statuses of the printer engine 120 stored in the storage device (not shown) such as a RAM inside the printer control circuit 100.

Denoted by S33 and S34 are priority statuses indicating the priority of the factors in the "density control execution request-factor status S31".

Figure 6:
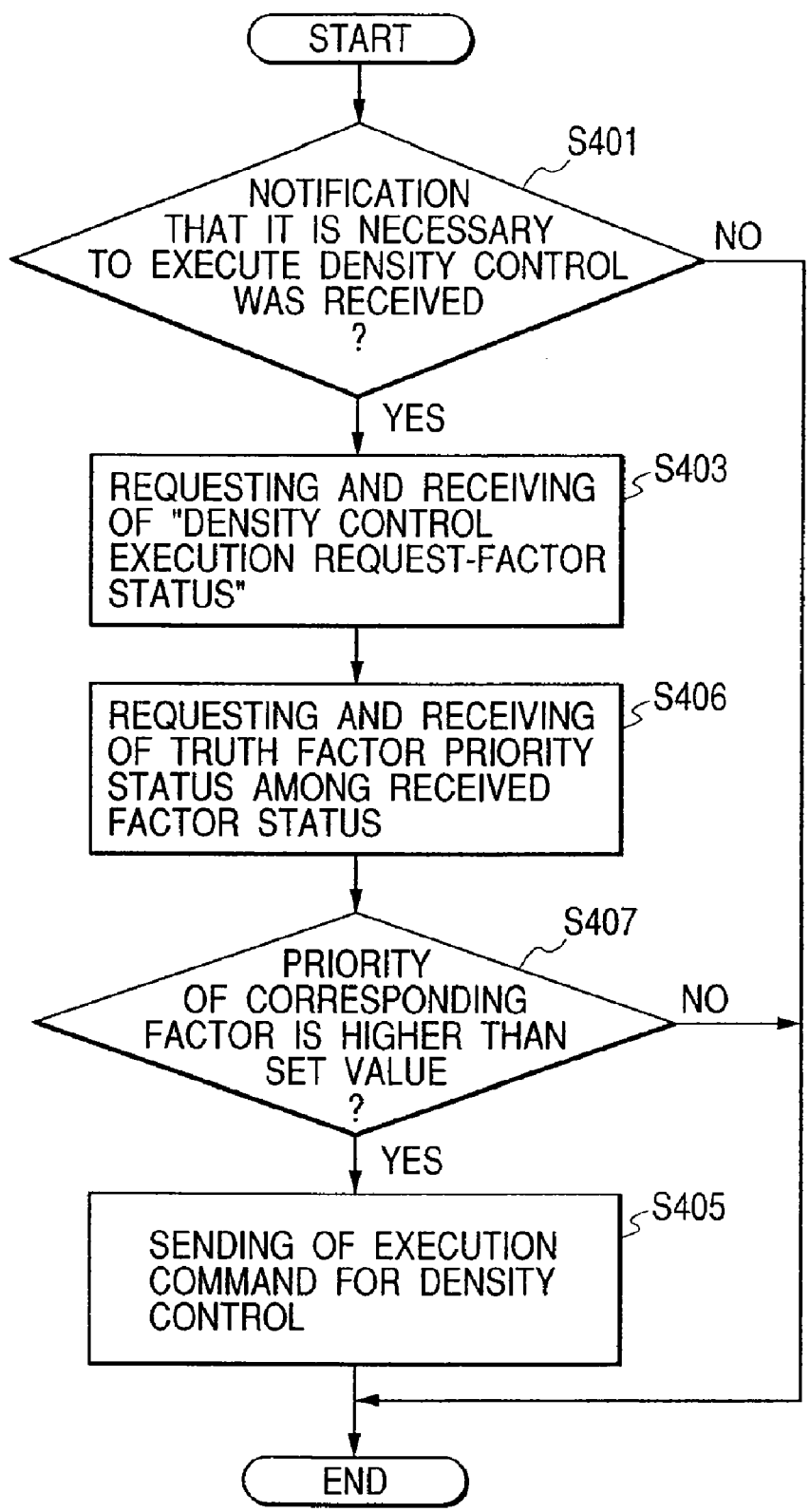
FIG. 6 is a flowchart showing a control sequence regarding a judgement as to whether to issue an instruction to execute a density control or not in the image forming apparatus according to the second embodiment of the present invention.
Figure 9:
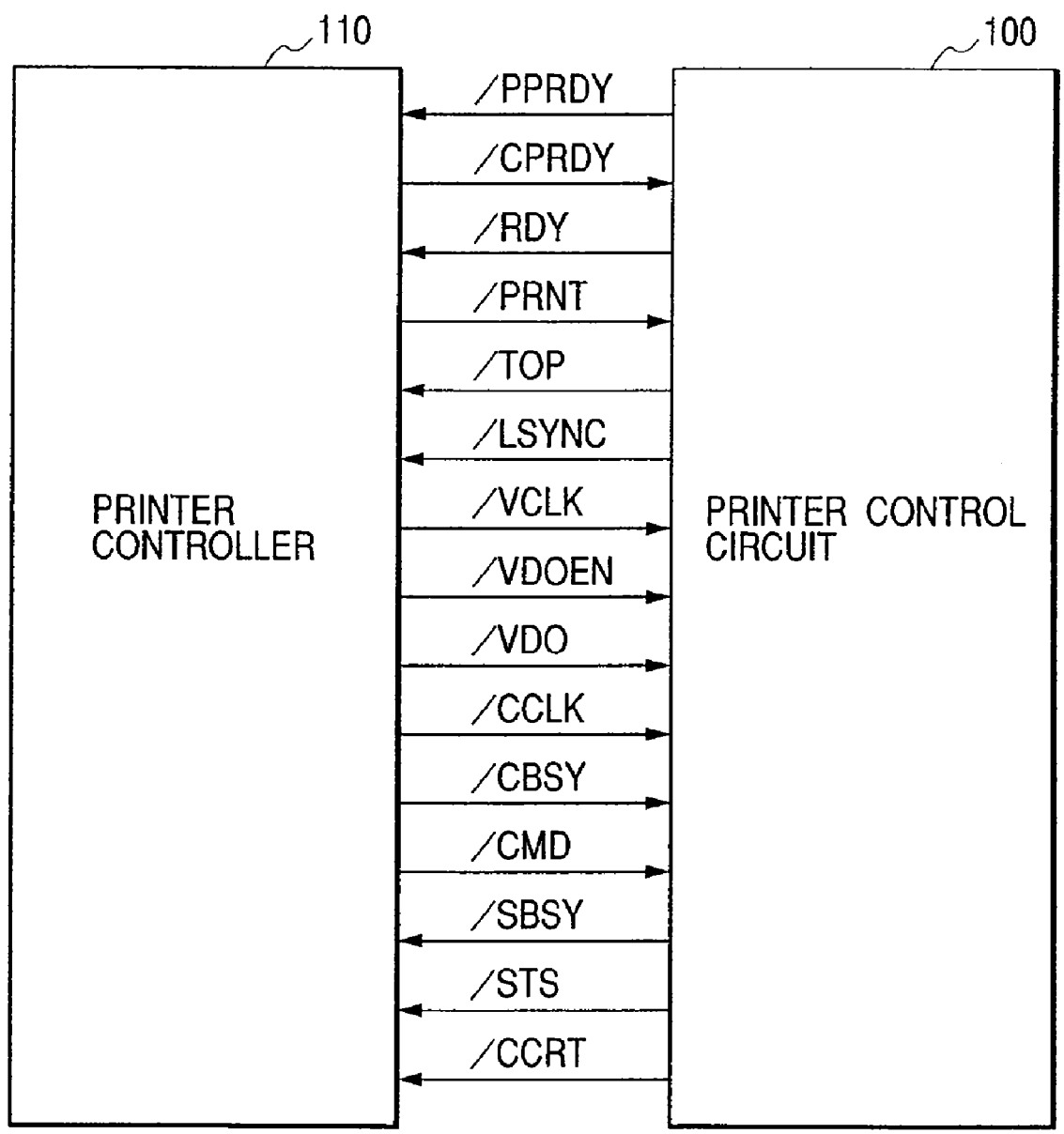
FIG. 9 shows signals of a video interface in detail.
Figure 11:
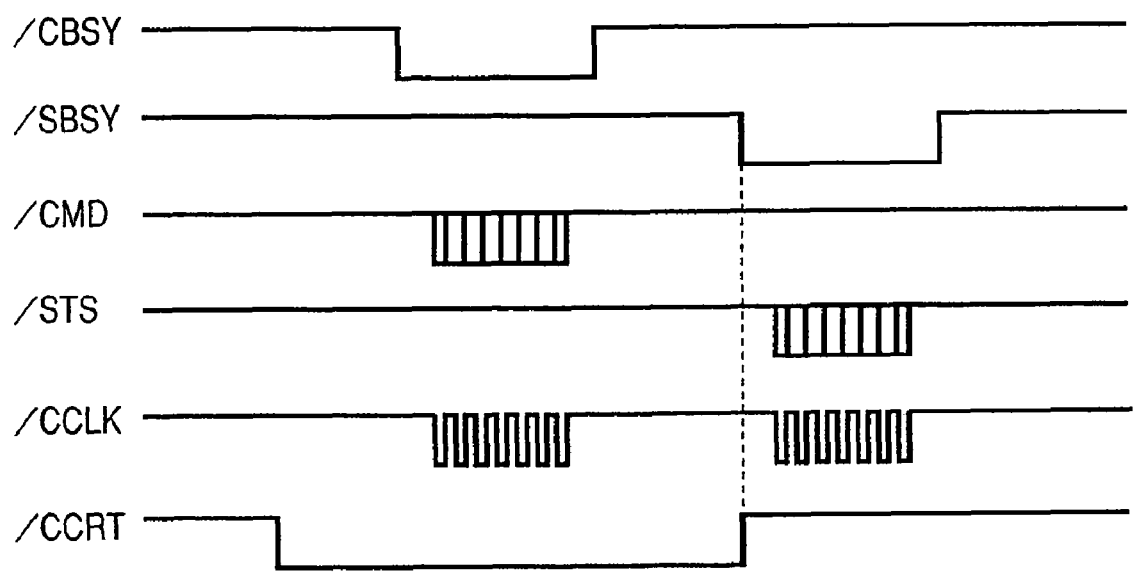
FIG. 11 is a timing chart showing an example of a timing of each signal in the case of using a signal "/CCRT"
Figure 12:
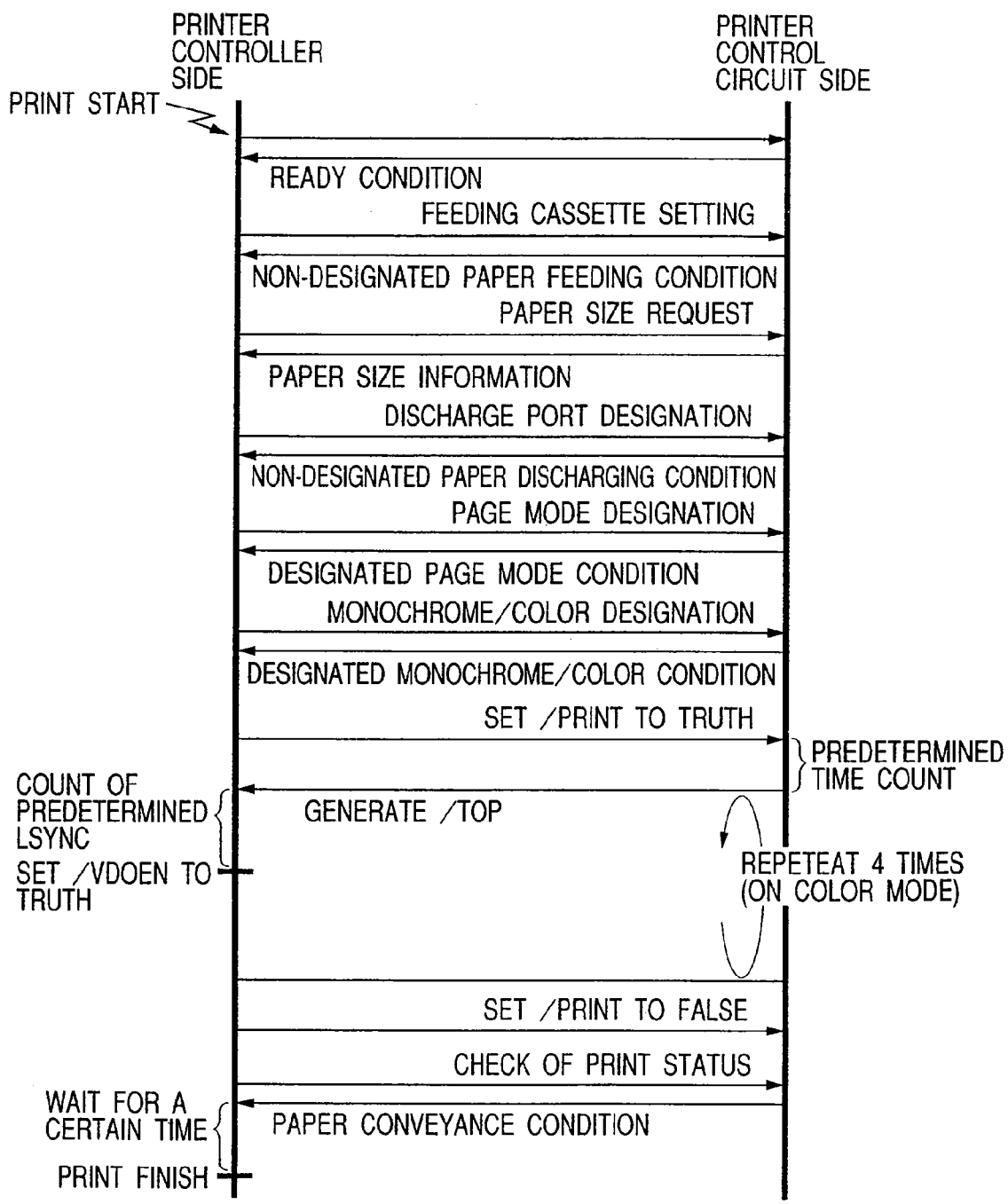
FIG. 12 is a sequence chart showing a transfer example of a command/status between a printer controller and a printer control circuit.
Figure 13:
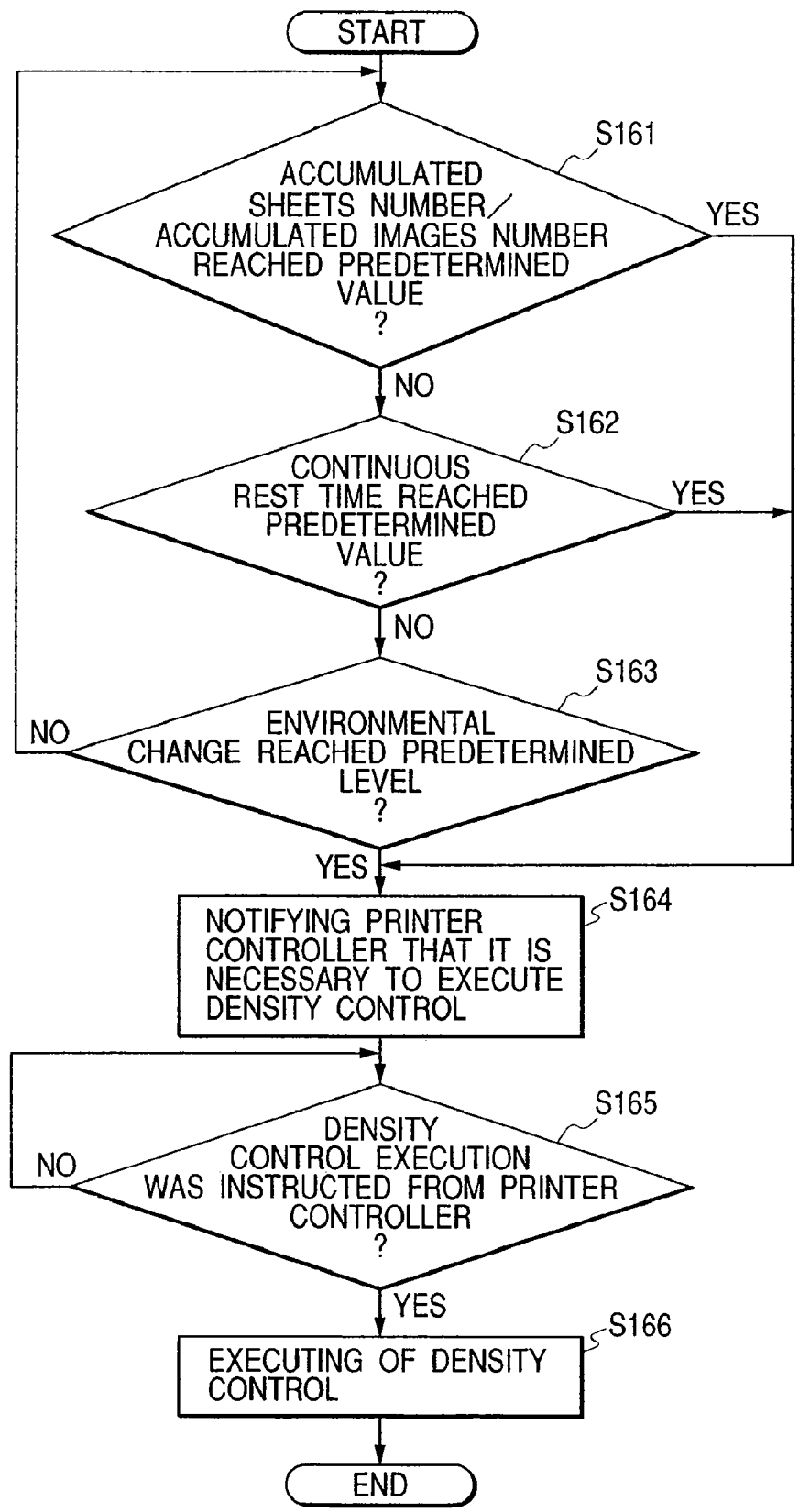
FIG. 13 is a flowchart showing a control sequence regarding a judgement as to whether to execute a density control or not in a printer control circuit in a conventional example.

FIG. 6 is a flowchart showing a control sequence regarding a judgement as to whether to issue an instruction to execute a density control or not using the printer controller 110.

FIG. 7 shows a table example illustrative of a correspondence between a factor whereby it is necessary to execute the density control and a factor priority thereof.

In FIG. 4, it is judged whether to execute the density control or not in steps S261 to S268 similarly to the first embodiment. The bit is set to truth, which corresponds to the factor whereby it is necessary to execute the density control in the "density control execution request-factor status S31" shown in FIGS. 5A to 5C.

In step S272, the priority of the bit set to truth in step S268 is set (updated) to the priority status S33 (or S34) shown in FIGS. 5A to 5C.

At this time, the correspondence between the factor whereby it is necessary to execute the density control and its priority may be drawn from the table, as shown in FIG. 7, for instance, stored in storage means such as a ROM inside the printer control circuit 100 or from the other sequence.

The subsequent steps S269 to S271 are the same as in the first embodiment.

On the other hand, as shown in FIG. 6, in step S401, the printer controller 110 judges whether or not the notification to the effect that it is necessary to execute the density control was received. When the notification to that effect was received, the processing advances to step S403; otherwise, the control sequence regarding the judgement as to whether to issue an instruction to execute the density control or not is ended.

In step S403, the printer controller requests the printer control circuit 100 to return the "density control execution request-factor status S31" and receives the status.

Subsequently, in step S406, in order to acquire the priority of the factor set to truth in the factor status S31, the controller requests the "density control execution request-factor priority status S33" (or S34) and receives the status.

Here, it is assumed that the user previously makes the setting regarding the execution frequency of the various adjustments through setting on the image quality etc., for instance.

In step S407, the controller compares the set value (predetermined value) with the priority of the factor whereby it is necessary to execute the density control, the priority of the factor being acquired in step S406. If the priority is higher than the set value (predetermined value), the controller sends an execution instruction command for density control (adjustment execution command) in step S405.

Also in step S407, the priority is lower than the set value (predetermined value), the control sequence regarding a judgement as to whether to issue an instruction to execute a density control or not is ended.

As described above, in this embodiment, the factor whereby it is necessary to execute the various adjustments is notified as a status together with the priority statuses S33 and S34 indicating the priority of the factors. Thus, the CPU (not shown) of the printer controller 110 can make a selection as to whether to issue an instruction to execute the adjustment or not at this point. At the same time, an image forming apparatus and a control method for the same can be provided, with which while satisfying the image quality at the minimum level, the adjustment execution frequency can be set stepwise by the user.

Note that in this embodiment, the description has been given of the judgements as to whether to execute the density control inclusive of density reproduction or not and whether or not to issue an instruction to execute the control. Needless to say, however, the same is applicable to a color component balance of a color image, color misregistration amount (shift amount of drum phases in respective colors of the color image) measurement, or other adjustments.

Also, the structure concerning the factors that suggest the necessity of the execution of the various measurements and concerning the priority of the factors as described in this embodiment is only a structure example of the image forming apparatus of this embodiment. The above may be varied according to the structure of the image forming apparatus to which the present invention is applied.

Also, the setting regarding the execution frequency of the various adjustments in this embodiment is adopted by way of example in this embodiment but there includes the settings on the image quality or the execution frequency of the various adjustments, which are programmed by the user or with a host computer, the printer controller 110, or the printer engine 120.

Also, in this embodiment, the case of judging whether to execute the adjustment of the image formation conditions or not using the condition status S30, the factor statuses S31 and S32, and the priority statuses S33 and S34 has been described. However, the present invention is not exclusively limited thereto but it is possible to judge whether to execute the adjustment or not only using the factor statuses S31 and S32 and the priority statuses S33 and S34.

For example, a table showing a correspondence between the factor statuses S31 and S32 and the required adjustments is prepared in advance in the printer controller 110 etc., so that the above can be attained.

As described above, it is possible to provide an image forming apparatus and a control method for the same, with which an adjustment for satisfying an image quality is performed without fail while an adjustment execution frequency can be changed, for example, an unnecessary adjustment can be skipped depending on user-established conditions.

Hereinabove, the preset invention has been described based on the several preferred embodiments but is not limited to those embodiments. It would be apparent that various modifications and applications can be made without departing from the scope of claims.

What is claimed is:

1. A printer engine that receives a command from a controller that issues commands representative of a plurality of kinds of instruction, and that executes an image formation according to the command, the printer engine comprising:

a judgment unit that judges whether an adjustment of an image formation condition is necessary based on a state of an inside of an image forming apparatus; and a control unit that transmits to the controller a request for executing the adjustment of the image formation condition based on a judgment of the judgment unit, and that transmits to the controller factor information according to a factor of execution of the adjustment of the image formation condition, wherein (i) in a case in which a factor, indicated by the factor information, of execution of the adjustment of the image formation condition is not set in advance in the controller, execution of the adjustment of the image formation condition is not issued from the controller to the printer engine, and (ii) in a case in which a factor, indicated by the factor information, of execution of the adjustment of the image formation condition is set in advance in the controller, an execution command for the adjustment of the image formation condition is issued from the controller to the printer engine so that the printer engine executes the adjustment of the image formation condition when the execution command is issued from the controller.

2. The printer engine according to claim 1, wherein the image formation condition relates to a density control of an image.

3. The printer engine according to claim 1, wherein the image formation condition relates to a color component balance of a color image.

4. The printer engine according to claim 1, wherein the image formation condition relates to a color misregister of a color image.

* * * * *